(12) United States Patent
Dickerson et al.

(10) Patent No.: US 10,235,657 B2
(45) Date of Patent: *Mar. 19, 2019

(54) SYSTEM AND METHOD TO TRACK TIME AND ATTENDANCE OF AN INDIVIDUAL AT A WORKPLACE FOR A SCHEDULED WORKSHIFT

(71) Applicant: API Healthcare Corporation, Hartford, WI (US)

(72) Inventors: Bryan Dickerson, Neosho, WI (US); Jonathan Michael Tallon, Hartland, WI (US); Gary Charles Sutcliffe, Slinger, WI (US)

(73) Assignee: API Healthcare Corporation, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/713,234

(22) Filed: Sep. 22, 2017

(65) Prior Publication Data

US 2018/0012189 A1    Jan. 11, 2018

Related U.S. Application Data

(63) Continuation of application No. 15/270,658, filed on Sep. 20, 2016, now Pat. No. 9,805,342, which is a
(Continued)

(51) Int. Cl.
*G06K 7/10* (2006.01)
*G06Q 10/10* (2012.01)
(Continued)

(52) U.S. Cl.
CPC ........... *G06Q 10/1091* (2013.01); *G08B 6/00* (2013.01); *G08B 7/06* (2013.01); *H04W 4/02* (2013.01)

(58) Field of Classification Search
CPC ........... G07C 1/14; G07C 1/10; G06Q 10/109
(Continued)

(56) References Cited

U.S. PATENT DOCUMENTS 4,170,015 A   10/1979   Elliano et al.
4,270,043 A   5/1981   Baxter et al.
(Continued)

FOREIGN PATENT DOCUMENTS

WO      2014017398      1/2014

OTHER PUBLICATIONS

Office Action for U.S. Appl. No. 15/270,658 dated Jan. 20, 2017, 9 pages.
(Continued)

*Primary Examiner* — Ahshik Kim
(74) *Attorney, Agent, or Firm* — Hanley, Flight and Zimmerman, LLC

(57) ABSTRACT

A system and method to track time and attendance of an individual at a workplace is provided. The system includes a location tracking system that detects a presence of a portable electronic device carried by the individual, a time clock system that records a registration time of the individual at the workplace, and a main controller. If the main controller receives an electronic communication indicative that the portable electronic device is at the workplace, and if the main controller does not detect recording of the individual registration time at the time clock system, and if the main controller detects a current time at or later than a start time of a scheduled work shift time period of the individual at the workplace, then main controller automatically causes an alert at the portable electronic device prompting the individual to transmit a feedback signal acknowledging need to record the registration time.

20 Claims, 4 Drawing Sheets

Related U.S. Application Data continuation of application No. 14/673,030, filed on Mar. 30, 2015, now Pat. No. 9,454,751.

(51) Int. Cl.
*H04W 4/02* (2018.01)
*G08B 6/00* (2006.01)
*G08B 7/06* (2006.01)

(58) Field of Classification Search
USPC .......................................................... 235/377
See application file for complete search history.

(56) References Cited

U.S. PATENT DOCUMENTS

| | | | |
|---|---|---|---|
| 4,812,627 A | 3/1989 | Wexler et al. | |
| 4,819,162 A | 4/1989 | Webb, Jr. et al. | |
| 5,717,867 A | 2/1998 | Wynn et al. | |
| 5,970,466 A | 10/1999 | Detjen et al. | |
| 6,356,875 B1 | 3/2002 | Green et al. | |
| 6,802,005 B1 | 10/2004 | Berson | |
| 6,823,315 B1 | 11/2004 | Bucci et al. | |
| 7,004,389 B1 | 2/2006 | Robinson et al. | |
| 7,081,743 B2 | 7/2006 | Liu et al. | |
| 7,229,013 B2 | 6/2007 | Ben-Aissa | |
| 7,233,919 B1 | 6/2007 | Braberg et al. | |
| 7,266,048 B1 | 9/2007 | King et al. | |
| 7,489,595 B2 | 2/2009 | King et al. | |
| 7,562,026 B2 | 7/2009 | DelMonego et al. | |
| 7,587,329 B2 | 9/2009 | Thompson et al. | |
| 7,817,012 B2 | 10/2010 | Ehlinger et al. | |
| 8,355,924 B2 | 1/2013 | Hertel et al. | |
| 8,359,221 B2 | 1/2013 | Gala | |
| 8,380,534 B2 | 2/2013 | Reynolds et al. | |
| 8,392,920 B2 | 3/2013 | Ostrovsky et al. | |
| 9,454,751 B1 | 9/2016 | Dickerson et al. | |
| 9,805,342 B2 * | 10/2017 | Dickerson | G06Q 10/1091 |
| 2003/0220815 A1 | 11/2003 | Chang et al. | |
| 2009/0059728 A1 | 3/2009 | Potash | |
| 2010/0204999 A1 | 8/2010 | Scarola | |
| 2011/0068892 A1 | 3/2011 | Perkins et al. | |
| 2012/0278211 A1 | 11/2012 | Loveland et al. | |
| 2013/0211975 A1 | 8/2013 | Masterson et al. | |
| 2013/0290154 A1 | 10/2013 | Cherry et al. | |
| 2014/0013252 A1 | 1/2014 | Ehrler et al. | |
| 2014/0207635 A1 | 7/2014 | Pappas et al. | |
| 2014/0278629 A1 | 9/2014 | Stephenson et al. | |
| 2015/0170104 A1 | 6/2015 | Yamada et al. | |

OTHER PUBLICATIONS

International Search Report and Written Opinion for PCT Application Serial No. PCT/US2016/024863 dated Jul. 1, 2016.14 pages.
Office Action for U.S. Appl. No. 14/673,030 dated Feb. 9, 2016, 18 pages.
Notice of Allowance for U.S. Appl. No. 14/673,030 dated Jun. 29, 2016, 11 pages.
Notice of Allowance for U.S. Appl. No. 15/270,658 dated Jul. 5, 2017, 10 pages.
KRONOS; "When Is Time Not on Your Side?", Time and Attendance; 8 pages.
uAttend BN5000 Biometric Fingerprint Time Clock; as viewed on Costco.com on Feb. 11, 2015; 1 page.
Canadian Patent Office, "Office action," issued in connection with Canadian patent application No. 2,980,591, dated Jul. 11, 2018, 8 pages.
European Patent Office, "The Extended European Search Report," issued in connection with European Patent application No. 16774049.7, dated Sep. 11, 2018, 9 pages.

* cited by examiner

| EMPLOYEE | TAG# | SCHEDULES START | LOCATION/TIME DETECTED | CLOCK TIME | REMINDERS SENT |
|---|---|---|---|---|---|
| JOHN DOE | 1234 | 12/1/2014 07:00 3WEST | 3WEST 07:05 | 07:07 | 07:05 |
| JANE DOE | 1235 | 12/1/2014 08:00 3NORTH | 3NORTH 08:04 | | 08:05, 08:15, 08:30 |
| FRED DOE | 1236 | 12/1/2014 09:00 PEDS | | | MANAGER AT 09:05 |

FIG. 4

SYSTEM AND METHOD TO TRACK TIME AND ATTENDANCE OF AN INDIVIDUAL AT A WORKPLACE FOR A SCHEDULED WORKSHIFT

CROSS REFERENCE TO RELATED APPLICATIONS

This application is a continuation application of, and claims benefit to the filing date of, U.S. patent application Ser. No. 15/270,658, filed Sep. 20, 2016, entitled "A SYSTEM AND METHOD TO TRACK TIME & ATTENDANCE OF AN INDIVIDUAL AT A WORKPLACE FOR A SCHEDULED WORKSHIFT", which is a continuation of U.S. patent application Ser. No. 14/673,030, filed Mar. 30, 2015, entitled "A SYSTEM AND METHOD TO TRACK TIME & ATTENDANCE OF AN INDIVIDUAL AT A WORKPLACE FOR A SCHEDULED WORKSHIFT", the entire disclosures of these applications are incorporated by reference herein.

TECHNICAL FIELD

The subject herein generally relates to a system and method to track time and attendance of an individual, and more specifically to a system and method operable to prompt an individual for action if located at the workplace and yet not registered with the time clock for a scheduled workshift.

BACKGROUND

The statements in this section merely provide background information related to the disclosure and may not constitute prior art. Time and attendance systems typically include employee time clock systems, whether mechanical punch clocks or electronic, at workplaces to assist employers in the tracking of time worked by employees. The time clock system collects date and time information collected with respect to the employee to establish a record to be used by payroll departments in calculating the appropriate pay for the employee. Certain known time clock systems employee various biometric technologies to verify the unique identity of the employee, including fingerprints or retina scans. Yet, current time and attendance systems still require significant supervisor or managerial time and expense to review the time clock transactions (e.g., clock-in, clock-out) for compliance with work schedules, overtime, and other rules and regulations, as well as to make appropriate corrections for payroll calculations. Known attempts to reduce this expense have been limited to employee education and discipline.

BRIEF SUMMARY

In view of the above recited concerns, there is need for a system and method of time and attendance that automatically and in general real-time monitors employee presence and compliance with recording or registration of time attendance at the time clock system, and that automatically triggers electronic communications of alert to reduce payroll review, correction and human intervention while sustaining employer-employee goodwill. The above-described needs are addressed by the embodiments of the subject matter described herein.

According to one aspect of the subject matter, a system to track a time and an attendance of an individual at a workplace is provided. The system includes a location tracking system having a stationary wireless device that detects a presence of a portable electronic device uniquely associated with and carried by the individual, the portable electronic device including a first microprocessor connected to an interface; a time clock system that records a registration time of the attendance of the individual at the workplace; and a main controller having a second microprocessor connected in communication with the location tracking system and the time clock system, where if the main controller receives a first electronic communication from the location tracking system transmitted in response to detecting the presence of the portable electronic device associated with the individual, and if the main controller does not detect recording of the registration time of the individual at the time clock system, and if the main controller detects a current time at or later than a predefined start time of a predefined scheduled work shift time period of the individual at the workplace, then in response the microprocessor automatically executes a plurality of computer program instructions to automatically transmit a second electronic communication that causes generation of an alert at the portable electronic device prompting the individual to transmit a feedback signal from the portable electronic device acknowledging need of the individual to record the register time at the time clock system.

According to another aspect, a system to track a time and an attendance of an individual at a workplace is provided. The system includes a location tracking system having a stationary wireless device that detects a presence of a portable electronic device uniquely associated with and carried by the individual, the portable electronic device including a first microprocessor connected to an interface; a time clock system that records a registration time of the individual at the workplace; and a main controller having a second microprocessor in communication with the location tracking system and the time clock system, where if no recording of the registration time of the individual at the clock system within a predefined work shift time period for the individual, then in response the microprocessor of the main controller automatically executes a plurality of computer program instructions to perform the following: automatically transmitting an electronic communication that causes the location tracking system transmit a feedback signal indicative if there is a stored location data of the presence of the individual at the workplace within the predetermined workshift time period, and if there is the location data per above, then automatically transmitting an electronic communication to the portable electronic device that causes an alert prompting for a feedback signal from the portable electronic device acknowledging need of the individual to record the registration time at the clock system.

According to yet another aspect, a method to track a time and an attendance of an individual at a workplace is provided. The method includes the steps of: detecting presence of a portable electronic device uniquely associated with and carried with the individual at the workplace; detecting the individual has not recorded a registration time at the clock system; and detecting if currently within a predefined scheduled work shift time period of the individual at the workplace, then in response, automatically transmitting an electronic communication to the portable electronic device that triggers an alert prompting for a feedback signal to be transmitted from the portable electronic device acknowledging need for the individual to record the registration time at the clock system.

This summary briefly describes aspects of the subject matter described below in the Detailed Description, and is not intended to be used to limit the scope of the subject matter described in the present disclosure.

BRIEF DESCRIPTION OF THE DRAWINGS

The features and technical aspects of the system and method disclosed herein will become apparent in the following Detailed Description in conjunction with the drawings in which reference numerals indicate identical or functionally similar elements.

FIG. 4 shows schematic diagram illustrative of an example of a display generated by the system of FIG. 1 in accordance to the subject matter described herein.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and other changes may be made without departing from the scope of the subject matter of this disclosure. The following detailed description is, therefore, provided to describe an exemplary implementation and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. The term user and/or the plural form of this term are used to generally refer to those persons capable of accessing, using, or benefiting from the present disclosure. As used herein, when the phrase "at least" is used, it is open-ended in the same manner as the term "comprising" is open-ended.

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
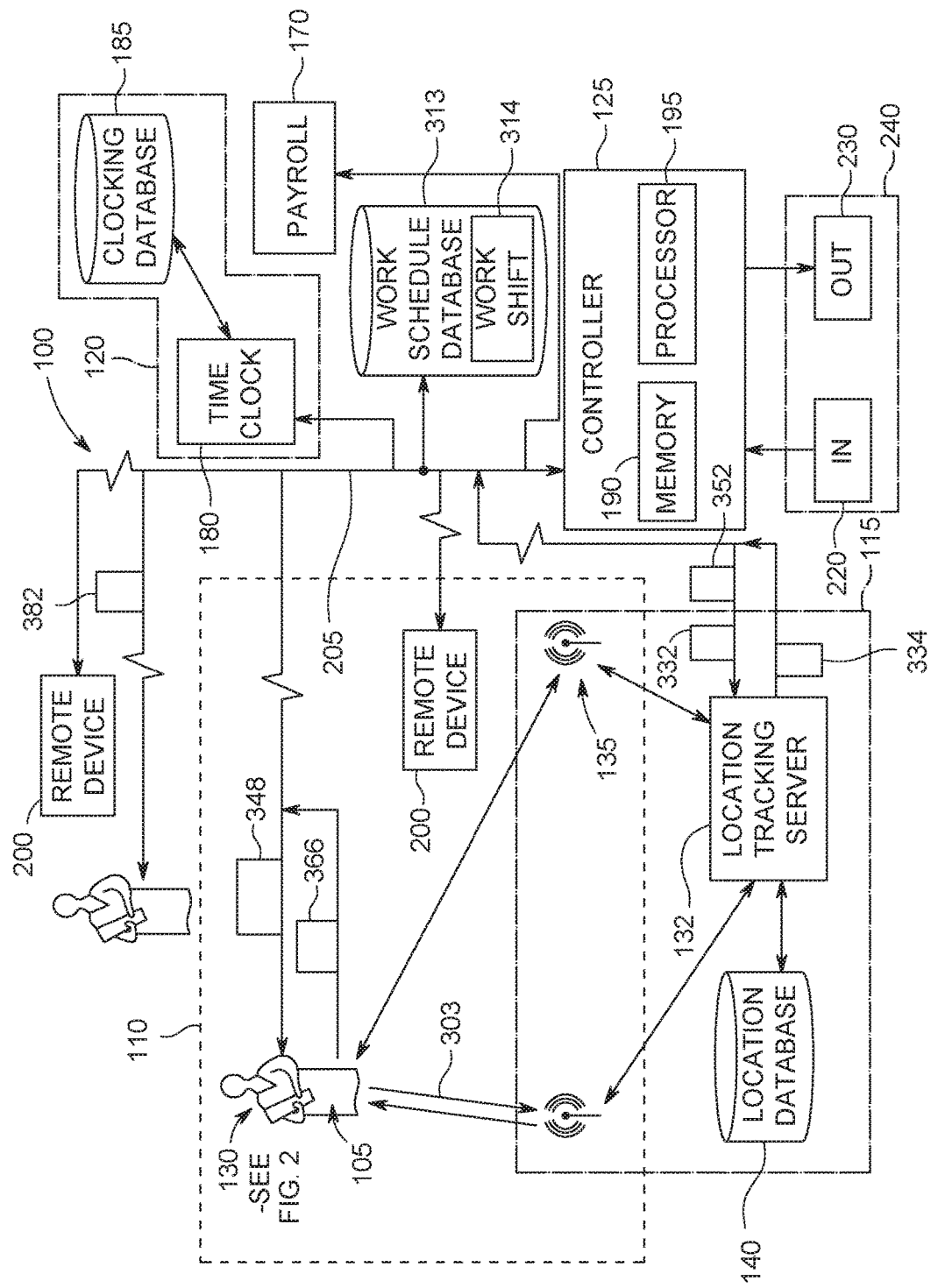
FIG. 1 shows a schematic block diagram of an example of a system in accordance to the subject matter described herein.

FIG. 1 illustrates one embodiment of a system 100 to track a time and an attendance of an individual 105 at a predefined area 110 of a workplace. The system 100 includes a location tracking system 115, and a time clock system 120 connected in communication with a main controller 125.

Examples of the individual 105 can be an employee of the workplace, a contractor or consultant or other third party person, etc. and is not limiting on the subject matter described herein.

The location tracking system 115 can be generally operable to track a presence of a portable electronic device 130 carried by the individual 105 within the predefined area 110 of the workplace in generally real-time. An example of the location tracking system 115 can include a main location tracking computer or computer server 132 in communication with a stationary device 135 (e.g., transceiver) operable to communicate back and forth with the portable electronic device 130 uniquely associated with an individual identification and carried by individual 105. The location tracking system 115 can employ various types of wireless technology (e.g., optical, radio frequency (RF), bar code scanning, ultrasound, global positioning (GPS), wireless local area network (WLAN), ultra-wide band (UWB), ultra high frequency (UHF), BLUETOOTH™, ZIGBEE™, WI-FI™, cellular-based positioning, infrared (IR), etc. or combination thereof) to track location of the portable electronic devices 130, and is not limiting on the subject matter described herein. The location tracking system 115 can include or otherwise be connected in communication with a location tracking database 140 for recording or storage of collected location data acquired by or received from the location tracking system 115 with respect to unique individual identifier uniquely associated with the portable electronic device 130.

Figure 2:
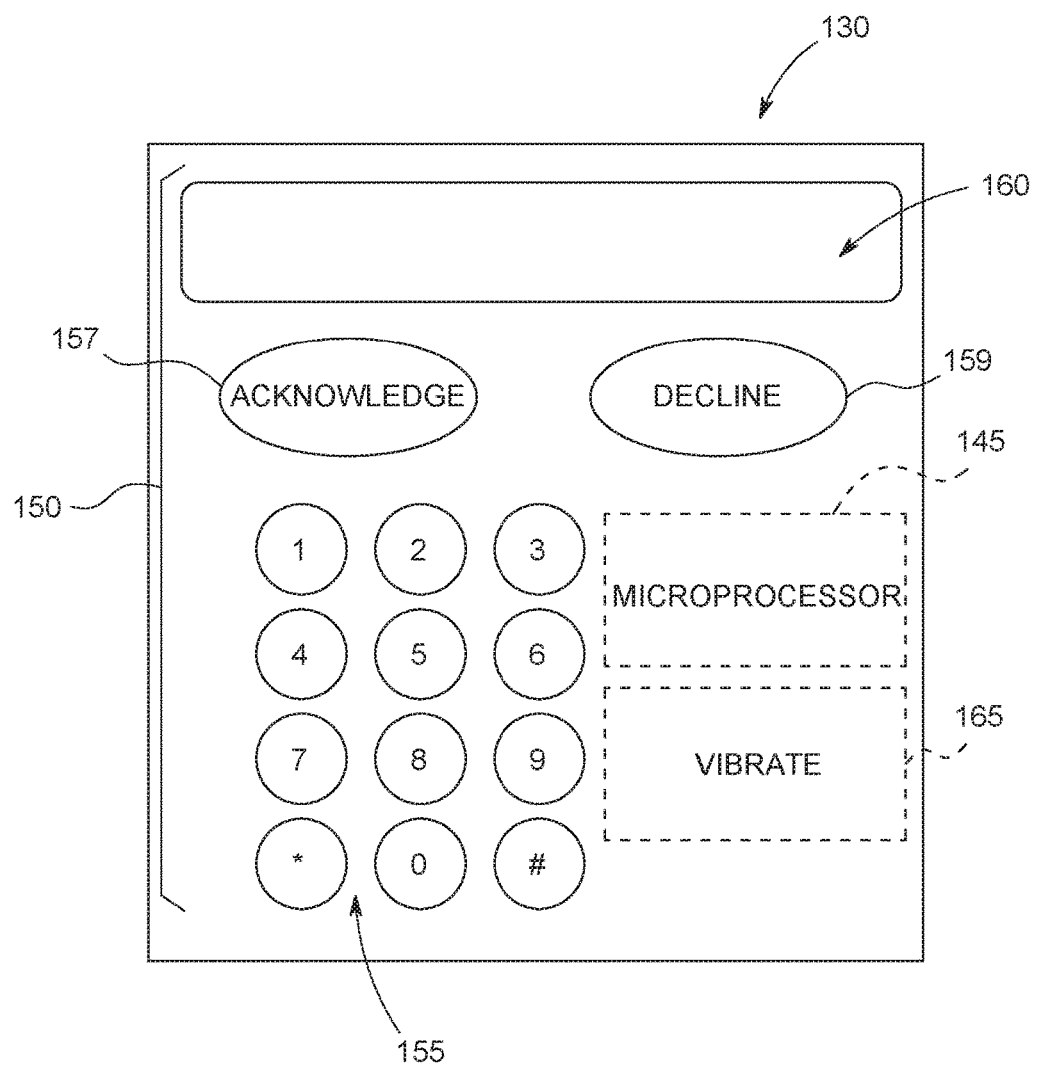
FIG. 2 shows a schematic diagram of an example of a portable electronic device employed in the system of FIG. 1 in accordance with the subject matter described herein.

Referring to FIG. 2, an example of the portable electronic device 130 can be generally operable to have its presence detected or tracked by the location tracking system 115. The portable electronic device 130 can include or be in the form of a passive or active identification tag or badge, cellular or mobile phones, etc. or combination thereof, having a microprocessor 145 connected to an interface 150. The interface 150 can include various input devices generally operable to receive instructions from the individual 105 for communication to the main controller, as well as an output device generally operable to illustrate feedback to the individual 105 as communicated from the main controller. An examples of the input device include a keypad or selector buttons 155, 157, 159 (e.g., mechanical or touch-activated), that when triggered instructs the portable electronic device 130 to communicate instructions to the main controller 125. The illustrated example of the portable electronic device 130 shown in FIG. 2 includes a keypad 155, an acknowledge selector button 157, and a decline selector button 159. An example of the output device can include a visual indicator 160 (e.g., LCD screen, LED light, etc.) or an audible indicator 165 or combination thereof operable to communicate feedback or electronic formatted message content communicated from the main controller.

The time clock system 120 can be generally operable to track or record a current date and clock-in (i.e., start) or clock-out (i.e., end) associated with a unique individual identifier at a place of employment. The time clock system 120 can be operable to translate information with respect to actions by the individual 105 to clock-in or clock-out into an electronic format for communication to other systems 170 for developing accounting records and reports, to generate payroll, etc. Examples of the time clock system 120 can be in hard-wired or wireless communication with other parts of the system 100. The time clock system 120 can include an internal clock mechanism to track current date and time, and employ readers or scanners operable to read information data associated with individual identification cards or tags or badges. The time clock system 120 can further include a local display 180 to visualize a category of the action (e.g., clock-in, clock-out, etc.) associated with a unique individual identifier, as well as the recorded current time and date for time and attendance purposes for storage and retrieval with a clocking database 185. The time clock system 120 can also employ other technologies to verify the unique identification associated with an action of the individual 105, including facial recognition, fingerprint scanning, retina scanning, etc. and is not limiting on the subject matter described herein.

The main controller 125 can be generally operative to receive, process, and convey information in the form of electronic communications to and from the location tracking system 115 and the time clock system 120. The example of the main controller 125 can generally include a memory 190 having a series of computer readable program instructions for execution by a computer processor 195. The example memory 190 can be a computer program product including a non-transitory, tangible, computer readable medium of varying type generally operable to store electronic formatted data or information and computer readable program instructions accessible and readable by the computer processor 195. In certain examples, the memory 190 can be accessible by a remote computing device 200 or the portable electronic device 130 carried by the individual 105 or supervisor via a network connection 205.

The computer-readable instructions can comprise a programming code for execution by the computer processor 195. The programming code can be embodied in software stored on the memory 190 independent of or in combination with software embodied in firmware or dedicated hardware. The computer program product may be stand-alone or integrated as part of the main controller 125. As used herein, the term tangible, non-transitory computer readable storage medium can be expressly defined to include any type of computer readable storage device and/or storage disk and to exclude propagating signal media and to exclude transmission media. As used herein, "tangible, non-transitory computer readable storage medium" and "tangible, non-transitory machine readable storage medium" can be used interchangeably.

Examples of the memory 190 can include, but are not limited to, random access memory (RAM), read only memory (ROM), Synchronous Dynamic Random Access Memory (SDRAM), Dynamic Random Access Memory (DRAM), EEPROM, flash memory, a cache, compact disc (CD), digital versatile disc (DVD) or other optical storage, magnetic cassettes, magnetic tape, magnetic disk storage or other magnetic storage devices, a hard drive, a flash memory, or any other medium which can be used to store the desired electronic format of information or program instructions for a duration and which can be accessed by the computer processor 195 or at least a portion of the main controller 125.

The example computer processor 195 can include hardware to execute one or more tasks as defined by the computer readable program instructions. The computer processor 195 can be, for example, part of a computer server, a laptop or desktop, a mobile device (e.g., a cell phone, a smart phone, a tablet such as an IPAD™), a personal digital assistant (PDA), an Internet appliance, or any other type of known computing device. For example, the computer processor 195 can be implemented by one or more integrated circuits, logic circuits, microprocessors or controllers from any desired family or manufacturer.

The memory 190 and computer processor 195 as referred to herein can be stand-alone or integrally constructed as part of various programmable computing devices of various types, including for example a cache, a desktop computer or laptop computer hard-drive, field-programmable gate arrays (FPGAs), application-specific integrated circuits (ASICs), application-specific standard products (ASSPs), system-on-a-chip systems (SOCs), programmable logic devices (PLDs), etc. or the like and any combination thereof operable to execute the instructions associated with implementing the method (discussed later) of the subject matter described herein.

The controller 125 of the system 100 can also be configured to communicate instructions to and from the remote computer devices 200. Examples of remote computer devices 200 as referenced herein can include: a mobile telephone; a computer such as a desktop or laptop type; a Personal Digital Assistant (PDA) or mobile phone; a notebook, tablet or other mobile computing device; or the like and any combination thereof. The subject matter of this description may be implemented as a stand-alone computer program product or as an application configured for execution by one or more of the remote computing devices 200. The application (e.g., webpage, downloadable applet or other mobile executable) can generate the various displays or graphic/visual representations described herein as graphic user interfaces (GUIs) or other visual illustrations, which may be generated as webpages or the like, in a manner to facilitate interfacing (receiving input/instructions, generating graphic illustrations) with users via the remote computing device(s) 200.

The network 205 can facilitate transmission of electronic format or digital data. The example network 205 can be a wired interface (e.g., a data bus, a Universal Serial Bus (USB 2.0 or 3.0) connection, etc.) and/or a wireless interface (e.g., radio frequency, infrared, optical, near field communication (NFC), etc.), a wide area network (WAN); a local area network (LAN); the Internet; a cloud-based computing infrastructure of computers, routers, servers, gateways, etc.; or any combination thereof associated therewith that allows the system 100 or portion thereof to communicate with various computing devices 200 described above.

With respect to the example of the network 205 as including a cloud-based infrastructure, the system 100 can share information via web-based applications, cloud storage and cloud services. For example, a Web-based portal may be used to facilitate access to information, etc. The system 100 can illustrate the Web-based portal as a central interface to access information and applications, and data may be viewed through the Web-based portal or viewer, for example. Additionally, data may be manipulated and propagated using the Web-based portal, for example. The Web-based portal can be accessible locally (e.g., in an office) and/or remotely (e.g., via the Internet and/or other network or connection 160), for example.

The main controller 125 can also be in communication with an input or input device 220 and an output or output device 230. Examples of the input device 220 include a keyboard, joystick, mouse device, touch-screen, track ball, light wand, voice control, or similar known input device known in the art. Examples of the output device 230 include a liquid-crystal monitor, a plasma screen, a cathode ray tube monitor, a touch-screen, a printer, audible devices, etc. The input device 220 and output device 230 can be independent of one another, or combination as an interface 240 to the system 100.

Having provided an example of one construction of the system 100 as shown in FIG. 1 in accordance with above-description, the following is a description of an example of a method 300 (See FIG. 3) to operate the system 100 in accordance with the subject matter described herein. It should also be understood that the sequence of the acts or steps of the method 300 as discussed in the foregoing description can vary. Also, it should be understood that the method 300 may not require each act or step in the foregoing description, or may include additional acts or steps not disclosed herein. It should also be understood that one or more of the steps of the method 300 can be represented by one or more computer program modules of computer-readable program instructions stored in the memory 190 of the system 100. As mentioned above, the method 300 can be implemented using coded instructions (e.g., computer and/or machine readable instructions). The terms module and component as referenced herein can generally represent program code or instructions that causes specified tasks when executed on the computer processor 195. The program code can be stored in one or more computer readable mediums that comprise the memory 190.

Figure 3:
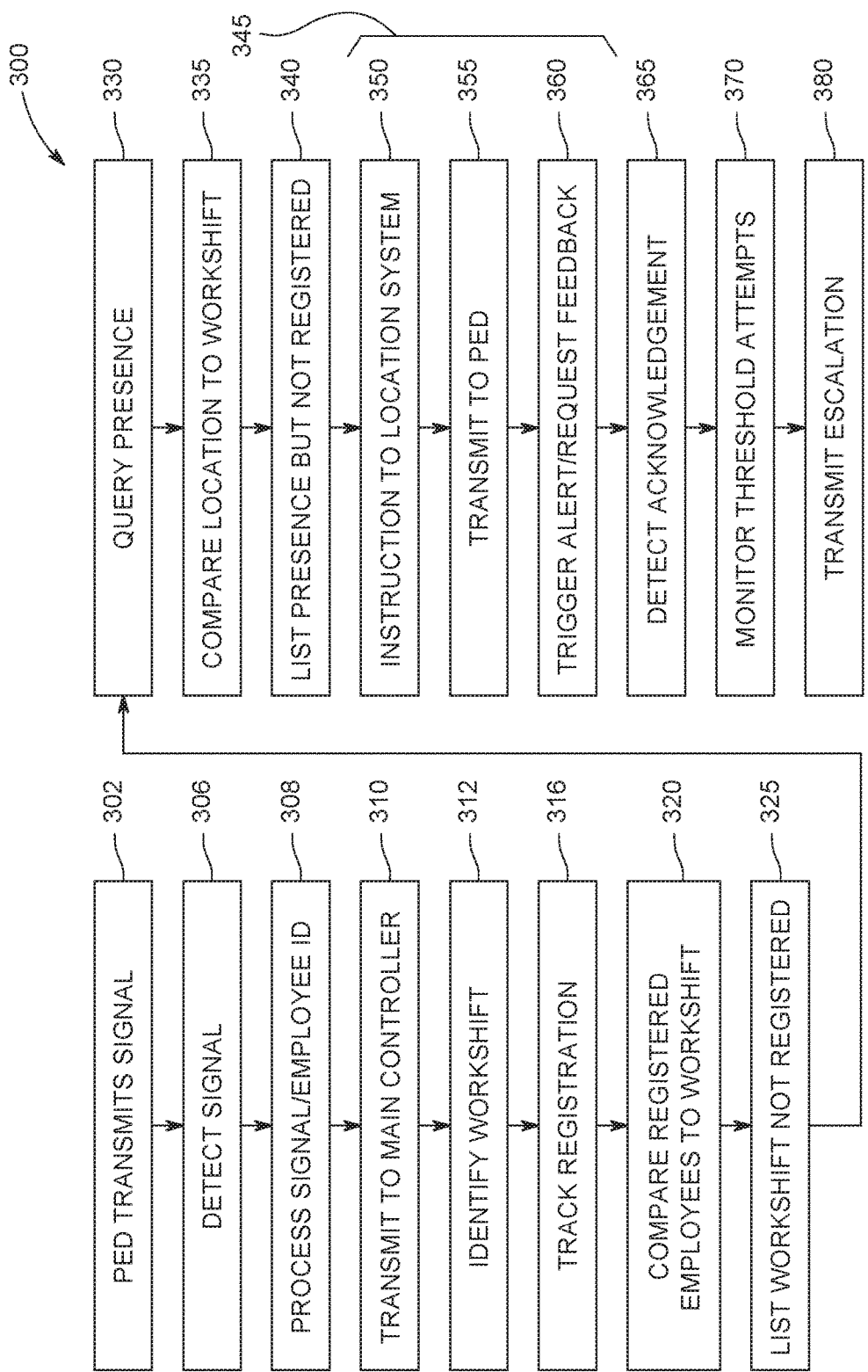
FIG. 3 illustrates a flow diagram of an example of a method of operating the system of FIG. 1 in accordance with the subject matter described herein.

Referring to FIG. 3 and for sake of example, assume step 302 includes detecting presence of a portable electronic device 130 uniquely associated with and carried with the individual 105 at the workplace. An example of step 302 can include the portable electronic device 130 transmitting a location or presence signal 303 (See FIG. 1) including the individual identifier data associated with the portable electronic device 130 (See FIG. 1). Step 306 can include the stationary reader 135 of the location tracking system 115 detecting receipt of the presence signal 303. Step 308 can include processing the presence signal 303 to identify the unique individual identification associated with a location of the stationary reader 135. Step 310 can include transmitting location data and associated individual identifier to the main controller 125. This example assumes that the portable electronic device 130 at least periodically transmits the presence signal 303. Alternatively, the portable electronic device 130 can interact in various other ways (e.g., passively) with the location tracking system 115 or combination thereof. The type of communicative interaction in detecting the location or presence data of the portable electronic device 130 with the location tracking system 115 can vary and is not limiting on the subject matter described herein.

Also, assume for example, step 312 includes the system 100 retrieving, from a scheduling database 313, stored information data of a predefined or predetermined workshift 314. The information data of the workshift 314 can be in electronic or digital format and include a list of unique identifiers for the individuals 105 scheduled to work for a time period or time frame having a start time (e.g., clock-in time) and an end time (e.g., clock-out) for the individual 105 to begin and end, respectively, for a particular date of employment at the workplace of employment. The start time and end time can be a distinct time value or a threshold value range. The workshift 314 can be stored in electronic format in the schedule database 313 for retrieval via the microprocessor of the main controller of the system 100.

Step 316 can include the time clock system 120 recording the registration time of the attendance (e.g., clock-in) associated with the unique individual identifier of the individual 105 at the predefined area 110 of the workplace. Step 320 includes comparing the list of individual identifiers of individuals 105 tracked to have registered (e.g., clocked-in) at the time clock system 120 in comparison to the list of individual identifiers of individuals 105 scheduled per the predefined workshift 314.

Step 325 includes detecting those individual identifiers associated with the individuals 105 that have not recorded a registration time at the time clock system 120. An example of step 325 can include detecting if a candidate individual identifier of an individual 105 is currently within a predefined scheduled time period of the work shift 314 associated with the individual 105 at the workplace. Step 325 can include the main controller 125 executing program instructions to search the work schedule database 313 of the system 100 and to identify the individual 105 associated with exceeding the predefined scheduled start time of the predefined workshift time period without recording the registration time at the time clock system 120.

For those individual identifiers of individuals 105 detected or tracked by the main controller 125 not have registered at the time clock system 120 for the workshift 314, step 330 can include transmission of an electronic communication or message 332 from the main controller 125 that instructs or triggers the location tracking system 115 to transmit a feedback signal or communication 334 indicative of recording a stored locative data indicative of the presence of the portable electronic device 130 and/or unique identifier associated with unregistered individuals 105 is recorded within a predefined scheduled time period of the work shift 314. Step 330 can also include transmission of the electronic communication 332 from the main controller 120 that triggers a search of the location database of the location tracking system 115 for the location data indicative of the portable electronic device 130 of the individual 105 at the workplace. Step 335 can include comparing the feedback signal or communication 334 from the location tracking system 115 received in response to step 330, with the information data in the workshift 314. The transmission of the feedback signal 334 from the location tracking system 115 can include data indicative of the last recorded location data with respect to detected presence of the individual identifier and/or portable electronic device 130 associated with the individual 105 at the predefined area 110 of the workplace, for comparison to information data of the individual identifier and scheduled location associated with the individual identifier of the individual 105 in accordance to stored information data of workshift 314. From step 335, step 340 can include identifying and creating a list of individual identifiers and associated portable electronic devices 130 associated with the individuals 105 identified as having location data indicative of presence at the predefined area of the workplace, scheduled for an applicable workshift, but not recorded a registration time at the time clock system 120.

In response if the system 100 detects that currently within a predefined scheduled work shift time period of the individual 105 at the workplace without detecting that the individual 105 recorded a registration time at the clock system 120, step 345 can include automatically transmitting an electronic communication or message 348 or signal to the portable electronic device 130 that triggers an alert or notification prompting for a feedback signal to be transmitted from the portable electronic device 130 acknowledging need for the individual 105 to record the registration time at the clock system 120. An example of step 345 can include the step 350 of the main controller 125 transmitting an electronic communication 352 with an instruction over the network 205, step 355 can include the electronic communication 352 triggering the location tracking system 115 to communicate the electronic communication 348 to the portable electronic device 130, and step 360 can include the electronic communication 348 triggering or causing the alerts or notifications described at the respective portable electronic devices 130 associated with individual identifiers of individuals identified and recorded on the list in step 335. The electronic communication 348 can trigger the alert or notification in the form a visual notification, a vibratory notification, or an audible notification or combination thereof from the display 160 or vibration mechanism 165 or combination thereof requesting acknowledgement or feedback from the individual 105 via the portable electronic device 130.

Step 365 can include receiving a feedback signal 366 from the portable electronic device 130. One example of the feedback signal 366 can include instructions operative to automatically cause the time clock system 120 to record the registration time for the individual 105 at a start time in accordance to the predefined work shift 314. In another example of step 365, the feedback signal 366 transmitted from the portable electronic device 130 of the individual 105 is operative to automatically cause the time clock system 120 to record the registration time of the individual 105 per an input time included in the feedback signal 366 as received via the input device 150 of the portable electronic device 130. In another example of step 365, the feedback signal 366 is triggered from activation of the selector buttons 157 or 159 with instructions or information data indicative of individual feedback of acknowledge or decline, respectively, the request to record a registration time at the time clock system 120 for illustration at the output 230.

Step 370 can include detecting transmission of a threshold number of electronic communications without detection of receipt of transmission of the feedback signal from the portable electronic device 130. In response to step 370 exceeding a threshold, step 380 can include automatically transmitting an electronic escalation communication or message 382 to a predefined recipient. The electronic escalation message 382 can be communicated to the remote device 200 associated with the predefined recipient, or to the portable electronic device 130 of the predefined recipient, per predefined program instructions stored at the main controller 125.

FIG. 4 shows a schematic diagram of an example of a graphic display 400 in accordance to the subject matter described herein for illustration at the output 230 (see FIG. 1) or remote devices 200. The display 400 can include a graphic illustration visually indicative of detected or identified events where the system 100 did not detect recording of a registration at the time clock system 120, where the illustration of each event can include a graphic illustration 405 of a list of unique individual identifications (e.g., names) of individual 105 in event, a graphic illustration 410 of identifiers of portable electronic device(s) 130 carried by the individual 105, a graphic illustration 415 of the respective workshift 314 or portion thereof (e.g., scheduled clock-in or start time) of the individual 105 associated with the event, a graphic illustration 420 of the location data (e.g., defined area, time, portable electronic device identifier, etc.) where the location tracking system 115 detected the portable electronic device 130 carried by the individual 105 at the defined area 110 of the workplace within the time frame of the predefined workshift 314. If the location tracking system 115 does not have location data indicative of the presence of the individual 105 at the predefined area 110 of the workplace, the graphic illustration 425 can be illustrative a graphic notification (e.g., alphanumeric, symbol, color, etc.) indicative of no presence detected for the individual 105 at the predefined area of the workplace, in contrast to the graphic illustration 420 of time and location detected. Graphic illustration 430 can include a value indicative of the recorded registration time associated with the individual 105 at the time clock system 120. If no recorded registration time at the time clock system 120 is detected by the system 100, then the graphic illustration 435 can be a graphic notification (alphanumeric, symbol, color, etc.) similar to the graphic illustration 425 described above. Graphic illustration 440 can include a numerical value or alphanumeric description of each of the time values when particular electronic communications were transmitted, or summation thereof, or time value when the escalation messages was transmitted or combination thereof.

In another example of the system 100 and method 300, the example of the portable electronic device 130 does not have the interface 150 and can configured in multiple portable electronic devices to provide similar operational function. In this example, a first portable electronic device 130 can be carried by the individual and configured in passive or active communication with the location tracking system 115 to communicate and record the location of the individual 105. A second portable electronic device 130 (e.g., cellular phone, pager, etc.), different than the first portable electronic device 130, can carried by the individual 105 and be configured to be in communication (e.g., wireless or network or combination thereof) to receive the communications 348 from the main controller 125 and to trigger the alert or notification to the individual to acknowledge the failure to register with the time clock system 120.

Although the above description of the system 100, method 300 and graphic display 400 is directed to the example of the individual 105, the subject matter described herein is not limited to this example, The system 100, method 300 and graphic display can be directed to time and attendance of various types of assets, such as a machine or hardware device equipped to carry the portable electronic device, in a similar manner as directed to the individual 105 as described above.

A technical effects of the subject matter described above can include, but is not limited to, providing the system 100 and method 300 of time and attendance that automatically and in general real-time monitors or audits a presence of the individual 105 and associated compliance with recording or registration of time attendance at the time clock system 120, and that automatically triggers electronic communications that reduces payroll review, correction and human intervention while sustaining employer-individual 105 goodwill. The system 100 and method 300 can employ real-time location system (RTLS) in conjunction with a time clock system 120 to create a list of individuals 105 scheduled to be registered or record their attendance within a certain time frame of a predefined workshift 314. The system 100 and method 300 can remove those individuals 105 from the list that record a registration time at the time clock system 120 in compliance with the workshift 314. Within a threshold of the schedule time for individuals 105 to register or record attendance, the system 100 and method 300 automatically queries the location tracking system 115 to detect if individuals 105 that failed to record a registration time are within the predefined area 110 of the workplace, and if so, to automatically facilitates the electronic communication 348 to cause an alert or notification (e.g., phone messaging or vibrating a portable electronic device 130 carried by the individual 105). Upon transmitting the electronic communication 348, the system 100 and method 300 monitors or detects if received the electronic communication 366 indicating an acknowledgement by the individual 105 of the need to record a registration time with the time clock system 120. If the system 100 and method 300 fail to detect the electronic communication 366 indicative of individual acknowledgement of the need to register or the individual 105 fails to respond, the system 100 and method 300 automatically transmits the electronic communication 382 to remote device 200 or portable electronic device 130 carried by the designated or predefined recipient to indicate the recordation failure event and the failure to correct the event. As such, the system 100 and method 300 facilitates notification and call to action when the individual 105 is scheduled to work, is on premise, and yet has failed to officially registered or recorded (e.g., clock-in) a registration time at the predefined area 110 of the workplace. Further, the system 100 and method 300 automatically trigger electronic communications 348 to facilitate correction in a timely manner. In addressing such failures to register in for work, the system 100 and method 300 reduces time and expense to make corrections and further improves the accuracy in monitoring the labor productivity at the workplace.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A location tracking system that tracks time and attendance of an individual at a location, the system comprising:
   a stationary wireless device that detects presence of a portable electronic device uniquely associated with and carried by the individual, the portable electronic device including a first microprocessor operatively connected to an interface;
   a time clock system that records registration time of attendance of the individual at the location; and
   a main controller having a second microprocessor connected in communication with the location tracking system and the time clock system, wherein if the main controller does not detect recording of registration time of the individual with the time clock system causes generation of an alert at the portable electronic device prompting the individual to transmit a feedback signal from the portable electronic device acknowledging need of the individual to record the registration time at the time clock system.

2. The system of claim 1, wherein the stationary wireless device detects presence of the portable electronic device within a predefined area of a workplace in real-time.

3. The system of claim 2, further comprising a location tracking database that stores collected location data acquired by or received from the location tracking system with respect to a unique individual identifier uniquely associated with the portable electronic device.

4. The system of claim 1, wherein the portable electronic device periodically transmits a presence signal.

5. The system of claim 1, wherein the system retrieves from a scheduling database stored information data of a predefined or predetermined work-shift.

6. The system of claim 3, wherein the time clock system records registration time of attendance associated with the unique individual identifier of the individual at the predefined area of the workplace.

7. The system of claim 1, wherein the alert is transmitted as at least one of: a visual notification, a vibratory notification or an audible notification.

8. The system of claim 7, wherein the system detects transmission of a threshold number of electronic communications without detection of receipt of transmission of the feedback signal from the portable electronic device, and in response to a threshold being exceeded automatically transmits an electronic escalation communication or message to a predefined recipient.

9. The system of claim 1, wherein the system automatically monitors or audits presence of the individual and associated compliance with recording or registration of time attendance at the time clock system.

10. The system of claim 1, further comprising a real-time location system (RTLS) in conjunction with the time clock system to create a list of individuals scheduled to be registered or record their attendance within a certain time frame of a predefined work-shift.

11. A location tracking methodology that tracks time and attendance of an individual at a location, comprising:
    using a stationary wireless device to detect presence of a portable electronic device uniquely associated with and carried by the individual, the portable electronic device including a first microprocessor operatively connected to an interface;
    using a time clock system to record registration time of attendance of the individual at the location; and
    using a main controller having a second microprocessor connected in communication with the location tracking system and the time clock system, wherein if the main controller does not detect recording of registration time of the individual with the time clock system to cause generation of an alert at the portable electronic device prompting the individual to transmit a feedback signal from the portable electronic device acknowledging need of the individual to record the registration time at the time clock system.

12. The method of claim 11, further comprising using the stationary wireless device to detect presence of the portable electronic device within a predefined area of a workplace in real-time.

13. The method of claim 12, further comprising using a location tracking database to store collected location data acquired by or received from the location tracking system with respect to a unique individual identifier uniquely associated with the portable electronic device.

14. The method of claim 11, further comprising retrieving from a scheduling database stored information data of a predefined or predetermined work-shift.

15. The method of claim 13, further comprising using the time clock system to record registration time of attendance associated with the unique individual identifier of the individual at the predefined area of the workplace.

16. The method of claim 11, further comprising transmitting the alert as at least one of: a visual notification, a vibratory notification or an audible notification.

17. The method of claim 16, further comprising detecting transmission of a threshold number of electronic communications without detection of receipt of transmission of the feedback signal from the portable electronic device, and in response to a threshold being exceeded automatically transmitting an electronic escalation communication or message to a predefined recipient.

18. The method of claim 11, further comprising automatically monitoring or auditing presence of the individual and associated compliance with recording or registration of time attendance at the time clock system.

19. The method of claim 11, further comprising using a real-time location system (RTLS) in conjunction with the time clock system to create a list of individuals scheduled to be registered or record their attendance within a certain time frame of a predefined work-shift.

20. A computer program product for facilitating tracking time and attendance of an individual at a location, the computer program product comprising a computer readable storage medium having program instructions embodied therewith, the program instructions executable by a processor to cause the processor to:

use a stationary wireless device to detect presence of a portable electronic device uniquely associated with and carried by the individual, the portable electronic device including a first microprocessor operatively connected to an interface;

use a time clock system to record registration time of attendance of the individual at the location; and use a main controller having a second microprocessor connected in communication with the location tracking system and the time clock system, wherein if the main controller does not detect recording of registration time of the individual with the time clock system to cause generation of an alert at the portable electronic device prompting the individual to transmit a feedback signal from the portable electronic device acknowledging need of the individual to record the registration time at the time clock system.

\* \* \* \* \*